United States Patent
Sonalker et al.

(10) Patent No.: US 11,745,727 B2
(45) Date of Patent: Sep. 5, 2023

(54) METHODS AND SYSTEMS FOR MAPPING A PARKING AREA FOR AUTONOMOUS PARKING

(71) Applicant: STEER-Tech, LLC, Annapolis Junction, MD (US)

(72) Inventors: Anuja Sonalker, Ellicott City, MD (US); Bohan Wang, Columbia, MD (US)

(73) Assignee: STEER-Tech, LLC, Annapolis Junction, MD (US)

( * ) Notice: Subject to any disclaimer, the term of this patent is extended or adjusted under 35 U.S.C. 154(b) by 0 days.

(21) Appl. No.: 17/351,685

(22) Filed: Jun. 18, 2021

(65) Prior Publication Data

US 2021/0309212 A1    Oct. 7, 2021

Related U.S. Application Data

(63) Continuation-in-part of application No. 16/242,102, filed on Jan. 8, 2019.

(Continued)

(51) Int. Cl.
*B60W 30/06* (2006.01)
*G01C 21/36* (2006.01)

(Continued)

(52) U.S. Cl.
CPC ......... *B60W 30/06* (2013.01); *G01C 21/3682* (2013.01); *G01C 21/3685* (2013.01); *G01C 21/3811* (2020.08); *H04W 4/021* (2013.01)

(58) Field of Classification Search
CPC .............. B60W 30/06; G01C 21/3682; G01C 21/3685; G01C 21/3811; H04W 4/021
See application file for complete search history.

(56) References Cited

U.S. PATENT DOCUMENTS 10,106,153 B1    10/2018  Xiao et al.
10,354,531 B1 *  7/2019   Bronder ................. G08G 1/144
(Continued)

FOREIGN PATENT DOCUMENTS

CN         108875758 A  *  11/2018  ........... G06K 9/6256

OTHER PUBLICATIONS

English translation for reference CN108875758A (Year: 2017).*
(Continued)

*Primary Examiner* — Rachid Bendidi
(74) *Attorney, Agent, or Firm* — Caldwell Intellectual Property Law, LLC

(57) ABSTRACT

Aspects relate to systems and methods for mapping a parking area for autonomous parking. An exemplary method includes receiving a point of interest designator for a point of interest, a drop-off location designator for a drop-off location, a parking location designator for a parking location, and a parking path designator for a parking path between the drop-off location and the parking location, receiving survey data of the point of interest from a remote device having at least a locating sensor, wherein survey data includes a drop-off geofence for the drop-off location, a parking geofence for the parking location, and a parking waypath for the parking path, and generating a parking map for the point of interest, wherein the parking map includes the drop-off location designator, the parking location designator, the parking path designator, the drop-off geofence, the parking geofence, and the parking waypath.

15 Claims, 5 Drawing Sheets

Related U.S. Application Data

(60) Provisional application No. 62/614,847, filed on Jan. 8, 2018.

(51) Int. Cl.
  *H04W 4/02* (2018.01)
  *H04W 4/021* (2018.01)
  *G01C 21/00* (2006.01)

(56) References Cited

U.S. PATENT DOCUMENTS

| | | | |
|---|---|---|---|
| 10,663,303 B2 | 5/2020 | Lawrenson et al. | |
| 10,816,346 B2 | 10/2020 | Wheeler et al. | |
| 10,942,516 B2 | 3/2021 | Rastoll et al. | |
| 10,999,719 B1 | 5/2021 | Kaplan | |
| 2017/0061632 A1* | 3/2017 | Lindner | G01S 17/86 |
| 2017/0138746 A1* | 5/2017 | Eliassi | G01C 21/3476 |
| 2017/0287170 A1* | 10/2017 | Perona | G06V 20/10 |
| 2018/0046198 A1* | 2/2018 | Nordbruch | G05D 1/0282 |
| 2018/0188036 A1 | 7/2018 | Hasberg et al. | |
| 2018/0301031 A1* | 10/2018 | Naamani | G06K 9/4604 |
| 2019/0137287 A1 | 5/2019 | Pazhayampallil et al. | |
| 2019/0137290 A1* | 5/2019 | Levy | G01C 21/3461 |
| 2019/0147331 A1 | 5/2019 | Arditi | |
| 2019/0369616 A1* | 12/2019 | Ostafew | B60W 60/00274 |
| 2020/0034620 A1 | 1/2020 | Lutterodt | |
| 2021/0180954 A1* | 6/2021 | Hiyokawa | G01C 21/3685 |

OTHER PUBLICATIONS

Nvidia, End-To-End HD Mapping for Self-Driving Cars, May 24, 2021.
Tong Qin, Tongqing Chen, Yilun Chen, Qing Su, AVP-Slam: Semantic Visual Mapping and Localization for Autonomous Vehicles in the Parking Lot, Jul. 8, 2020.

* cited by examiner

METHODS AND SYSTEMS FOR MAPPING A PARKING AREA FOR AUTONOMOUS PARKING

CROSS-REFERENCE TO RELATED APPLICATIONS

This application is a continuation-in-part of Non-provisional application Ser. No. 16/242,102 filed on Jan. 8, 2019, and entitled "AUTOMATED VALET SYSTEM," the entirety of which is incorporated herein by reference, and which claims the benefit of priority of U.S. Provisional Patent Application Ser. No. 62/614,847, filed on Jan. 8, 2018, and titled "AUTOMATED VALET SYSTEM," which is incorporated by reference herein in its entirety.

FIELD OF THE INVENTION

The present invention generally relates to the field of computerized vehicle controls. In particular, the present invention is directed to methods and systems for mapping a parking area for autonomous parking.

BACKGROUND

Currently many automakers make vehicles which may operate with some level of automation. However, the public has yet benefit in large measure from this technological leap. A lot of discomfort exists around the possibility of allowing automatically driven vehicles to take over all driving tasks; and indeed it appears many driving circumstances arise that baffle the automated systems of current self-driving vehicles, for instance poorly labeled and crowded city streets.

SUMMARY OF THE DISCLOSURE

In an aspect a method of mapping a parking area for autonomous parking includes receiving, using a computing device, a point of interest designator for a point of interest, a drop-off location designator for a drop-off location associated with the point of interest, a parking location designator for a parking location associated with the point of interest, and a parking path designator for a parking path between the drop-off location and the parking location, receiving, using the computing device, survey data of the point of interest from a remote device having at least a locating sensor, wherein survey data includes a drop-off geofence for the drop-off location, a parking geofence for the parking location, and a parking waypath for the parking path, and generating, using the computing device, a parking map for the point of interest, wherein the parking map includes the drop-off location designator, the parking location designator, the parking path designator, the drop-off geofence, the parking geofence, and the parking waypath.

In another aspect a system for mapping a parking area for autonomous parking includes a computing device configured to receive a point of interest designator for the point of interest, a drop-off location designator for the drop-off location, a parking location designator for the parking location, and a parking path designator for the parking, receiving survey data of the point of interest from a remote device having at least a locating sensor, wherein the survey data includes a drop-off geofence for a drop off location associated with the point of interest, a parking geofence for a parking location associated with the point of interest, and a parking waypath for a parking path between the drop-off location and the parking location, generate a parking map for the point of interest, wherein the parking map includes the drop-off location designator, the parking location designator, the parking path designator, the drop-off geofence, the parking geofence, and the parking waypath.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for mapping a parking area for autonomous parking. In an embodiment, a point of interest is mapped so that a user may automatically park and summon her autonomous vehicle at the point of interest.

Aspects of the present disclosure can be used to allow the public to benefit today from self-driving car technology by having their current vehicle drop them off and pick them up at points of interest which are mapped specifically to allow for this purpose. Aspects of the present disclosure can also be used to allow a point of interest to offer automatic valet services for those visit the point of interest. This is so, at least in part, because the current disclosure describes systems and methods which can be used with substantially any point of interest, for example a point of interest having access to any ordinary parking lot or parking garage.

Aspects of the present disclosure allow for mapping of points of interest for automatic parking. Exemplary embodiments illustrating aspects of the present disclosure are described below in the context of several specific examples.

Figure 1:
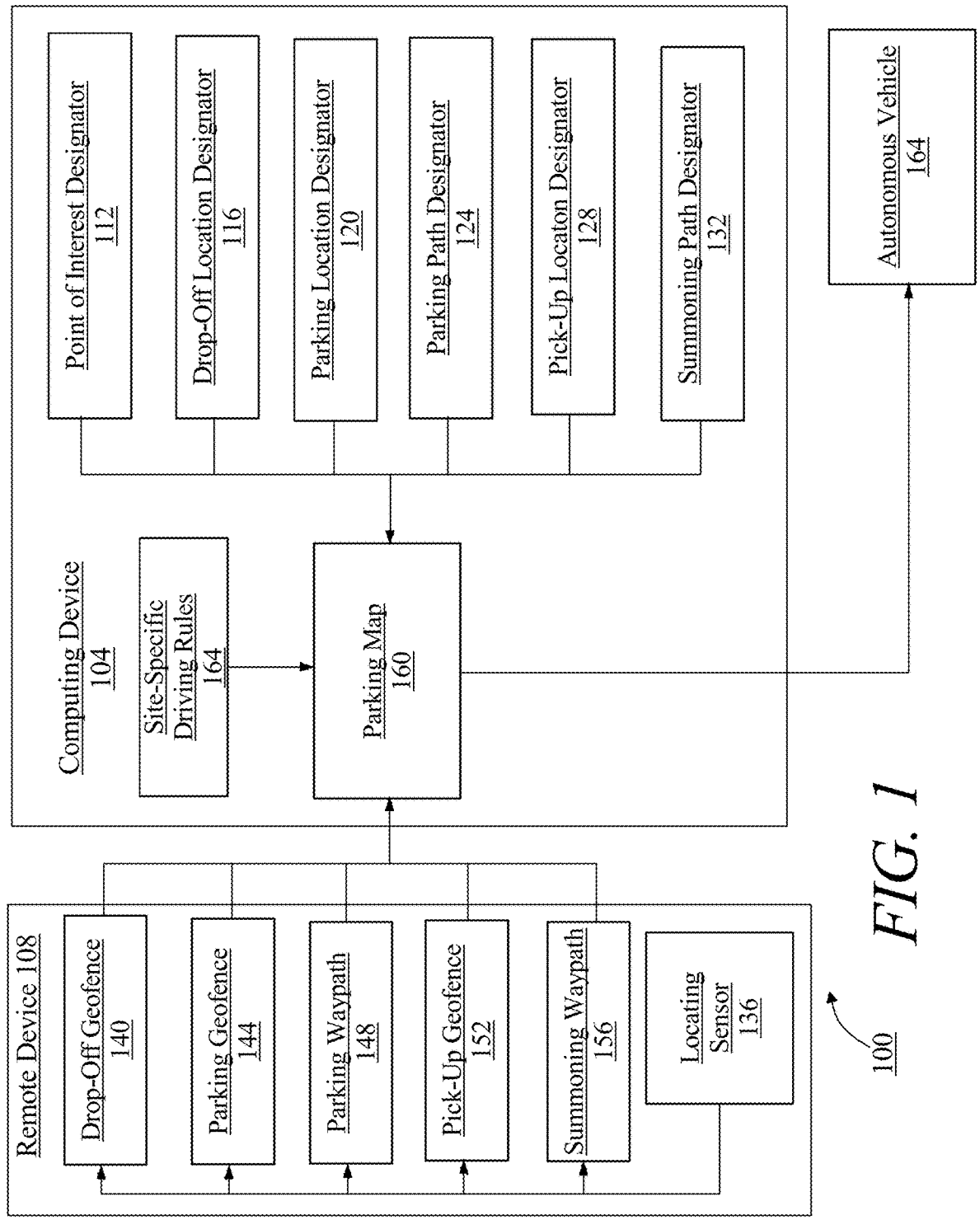
FIG. 1 is a block diagram illustrating an exemplary system for mapping a parking area for autonomous parking.

Referring now to FIG. 1, an exemplary embodiment of a system 100 for mapping a parking area for autonomous parking is illustrated. As used in this disclosure, "mapping" is a process of generating a symbolic representation, i.e., a map, of a geographic location, for example without limitation a parking lot and surrounding areas. Mapping may include generation of machine and/or human readable maps. In some cases, mapping may be performed with requisite specificity that it may be understood as world modeling. As used in this disclosure, "world modeling" is a process of generating a machine-readable model of a world surrounding a device, such that the device is able to function autonomously by using at least in part the model. As used in this disclosure, "autonomous" is an attributive term referring to an ability of a device, i.e., machine, to function without human intervention. The society of Automotive Engineers (SAE) has defined six different levels (0-5) to categorize the type of automation a vehicle may be configured to perform. Levels 0-3 all require a driver and cannot travel from a first point to a second point without any human interaction during the trip. Level 4 vehicles are configured to perform all safety critical driving functions and monitor roadway conditions for an entire trip between a first point and a second point without any human interaction during the trip. However, level 4 vehicles are limited according to their corresponding operational design domain (ODD). Level 5 vehicles may perform all driving tasks under any conditions. The SAE levels for automated vehicles have been adopted by various entities including the National Highway Traffic Safety Administration. As used in this disclosure, an "autonomous vehicle" is fully autonomous and able to drive without human oversight; for example, in some cases, an autonomous vehicle may operate at a SAE automation level of 4. In some cases, an autonomous vehicle may operate without a human present within the vehicle.

With continued reference to FIG. 1, system includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 may include a remote device 108. As used in this disclosure, a "remote device" is a computing device that is remote to the computing device; remote device may be geographically remote, i.e., located in a different place, to computing device and/or remote device may be cybernetically remote, i.e., located on a different network, than the computing device. Remote device 108 may be communicative (or said another way communicatively connected) with computing device 104. For example, remote device 108 may be connected to computing device 104 by way of one or more networks. Non-limiting examples of networks include Ethernet, Internet, local area networks, wide area networks, wireless networks, cellular networks, and the like.

With continued reference to FIG. 1, computing device 104 may be configured to receive a point of interest designator 112 for a point of interest. As used in this disclosure, a "point of interest" is geographic location, area, or point, to which a car may, generally speaking, be driven; for instance, a shop in a mall may be considered a point of interest, according to this disclosure, even though one would not drive their car into the mall to get to the shop but would instead park near the mall and walk to the shop. As used in this disclosure, a "point of interest designator" is at least an element of data that symbolizes a point of interest. Non-limiting examples of point of interest (POI) designators include a POI name, a POI identification (i.e., serial) number, a POI positional coordinates, a POI descriptor, a POI characteristic, and the like.

With continued reference to FIG. 1, computing device 104 may be configured to receive a drop-off location designator 116 for a drop-off location associated with point of interest. As used in this disclosure, a "drop-off location" is a geographic location, area, or point, where an autonomous vehicle may be driven to and dropped off for automatic parking. In some embodiments, autonomous vehicle may be dropped off at a drop-off location and the autonomous vehicle may automatically park itself from the drop-off location without intervention from a human driver. The term "drop-off" may be considered as relating to a passenger (and/or driver) of autonomous vehicle being dropped off, for example at a point of interest; alternatively or additionally, "drop off" may be considered to relate to the autonomous vehicle itself being dropped off, for example for automatic parking. As used in this disclosure, a "drop-off location designator" is at least an element of data that symbolizes a drop-off location. Non-limiting examples of drop-off location designators include a drop-off location name, a drop-off location identification (i.e., serial) number, a drop-off location positional coordinates, a drop-off location descriptor, a drop-off location characteristic, and the like.

With continued reference to FIG. 1, computing device 104 may be configured to receive a parking location designator 120 for a parking location associated with point of interest. As used in this disclosure, a "parking location" is a geographic location, area, or point where an autonomous vehicle may automatically park. Non-limiting examples of parking locations include parking lots, parking garages, on-street parking, temporary parking areas (e.g., fields, closed roads, and the like), driveways, garages, and the like. As used in this disclosure, a "parking location designator" is at least an element of data that symbolizes a parking location. Non-limiting examples of parking location designators include a parking location name, a parking location identification (i.e., serial) number, a parking location positional coordinates, a parking location descriptor, a parking location characteristic, and the like.

With continued reference to FIG. 1, computing device 104 may be configured to receive a parking path designator 124 for a parking path between drop-off location and parking location. As used in this disclosure, a "parking path" is a path an autonomous vehicle takes from a drop-off location to a parking location. A parking path may include, without limitation roads, highways, driveways, parking lots, parking garages, and the like. As used in this disclosure, a "parking path designator" is at least an element of data that symbolizes a parking path. Non-limiting examples of parking path designators include a parking path name, a parking path identification (i.e., serial) number, a parking path positional coordinates, a parking path descriptor, a parking path characteristic, and the like.

Still referring to FIG. 1, in some embodiments, computing device 104 may be configured to receive a pick-up location designator 128 for a pick-up location associated with point of interest. As used in this disclosure, a "pick-up location" is a geographic location, area, or point, where an autonomous vehicle may drive to and pick up a user. In some embodiments, autonomous vehicle may autonomously drive, without intervention from a human driver to a pick-up location and the human driver may pick-up the autonomous vehicle at the pick-up location. The term "pick up" may be considered as relating to a passenger (and/or driver) of autonomous vehicle being picked up, for example at a point of interest after the autonomous vehicle has been summoned; alternatively or additionally, "pick up" may be considered to relate to the autonomous vehicle itself being picked up, for example from automatic parking. As used in this disclosure, a "pick-up location designator" is at least an element of data that symbolizes a pick-up location. Non-limiting examples of pick-up location designators include a pick-up location name, a pick-up location identification (i.e., serial) number, a pick-up location positional coordinates, a pick-up location descriptor, a pick-up location characteristic, and the like.

Still referring to FIG. 1, in some embodiments, computing device 104 may be configured to receive a summoning path designator 132 for a summoning path between parking location and pick-up location. As used in this disclosure, a "summoning path" is a path an autonomous vehicle takes from a parking location to a pick-up location. A summoning path may include, without limitation roads, highways, driveways, parking lots, parking garages, and the like. As used in this disclosure, a "summoning path designator" is at least an element of data that symbolizes a summoning path. Non-limiting examples of summoning path designators include a summoning path name, a summoning path identification (i.e., serial) number, a summoning path positional coordinates, a summoning path descriptor, a summoning path characteristic, and the like.

With continued reference to FIG. 1, as used in this disclosure, "survey designators" is a term for designators associated with a point of interest. For example without limitation, point of interest designator 112, drop-off location designator 116, parking location designator 120 parking path designator 124, pick-up location designator 128, and summoning path designator 132 may all be considered survey designators. In some cases, a user may input survey designators into computing device 104 directly or by way of another computing device in communication with the computing device 104. Alternatively and/or additionally, remote device 108 may communicate survey designators to computing device 104. In some cases, a user may input survey designators into remote device 108.

With continued reference to FIG. 1, remote device 108 may include or otherwise be communicative with a locating sensor 136. As used in this disclosure, a "locating sensor" may be any sensor or plurality of sensors that can be used to detect information useful for determining a location of the sensor. Non-limiting examples of locating sensors include a global position sensor (GPS), a computer vision system, for example with pose estimation based upon feature tracking of objects, stereoscopic vision, radio-based locating sensors, for example RAdio Detection And Ranging (RADAR) and Ultra-Wideband, light-based locating sensors, for example Light Detection And Ranging (LiDAR), sound-based locating sensors, for example sound navigation and ranging (Sonar), ultrasound-based locating sensors, radio frequency identification (RFIS) sensors, Bluetooth, infrared-based locating sensors, cellular-based locating sensors, wireless local area network (WLAN) based sensors, laser-based locating sensors, and the like. Remote device 104 and locating sensor 136 may be configured to survey point of interest. As used in this disclosure, "surveying" is an act of measuring and recording with a certain level of precision a geographic location, area, or point. In some embodiments, aspects of the present invention may allow non-expert users to survey a point of interest and/or geographic locations associated with a point of interest with a certain level of precision, without need for extensive training. In some embodiments, remote device 108 may include a remote computing device and at least a locating sensor 136 communicatively connected to the remote computing device. In some cases, at least a locating sensor 136 comprises a global positioning sensor.

With continued reference to FIG. 1, remote device 108 and locating sensor 136 may be configured to survey a drop-off geofence 140 for drop-off location. As used in this disclosure, a "drop-off geofence" is at least an element of data that represents a positional boundary of a drop-off location to a certain level of precision. Remote device 108 and locating sensor 136 may be configured to survey a parking geofence 144 for parking location. As used in this disclosure, a "parking geofence" is at least an element of data that represents a positional boundary of a parking location to a certain level of precision. In some embodiments, parking geofence 144 may include coordinates (e.g., geofence and/or waypoints) associated with at least a parking spot within parking location. In some embodiments, parking geofence 144 may include coordinates associated with a "default" parking spot. In some cases, default parking spot coordinates may be used for parking map administration purposes, including without limitation disambiguation, or resolving conflicts or occupancy conflicts in edge cases. Remote device 108 and locating sensor 136 may be configured to record a parking waypath 148 for parking path. As used in this disclosure, "recording" is an act of measuring and recording with a certain level of precision a geographic location, area, or path along which an autonomous vehicle is intended to be driven. In some embodiments, aspects of the present invention may allow non-expert users to record a path and/or geographic locations associated with a path with a certain level of precision, without need for extensive training. As used in this disclosure, a "parking waypath" is at least an element of data that represents a parking path. In some cases, a parking waypath 148 may include one or more waypoints representative of locations along the parking path.

Still referring to FIG. 1, in some embodiments, remote device 108 and locating sensor 136 may be configured to survey a pick-up geofence 152 for pick-up location. As used in this disclosure, a "pick-up geofence" is at least an element of data that represents a positional boundary of a pick-up location to a certain level of precision. In some embodiments, remote device 108 and locating sensor 136 may be configured to record a summoning waypath 156 for summoning path. As used in this disclosure, a "summoning waypath" is at least an element of data that represents a summoning path. In some cases, a summoning waypath 156 may include one or more waypoints representative of locations along summoning path.

With continued reference to FIG. 1, remote device 108 may be configured to upload one or more of drop-off geofence 140, parking geofence 144, and parking waypath 148 to computing device 104. In some embodiments, remote device 108 may be configured to upload one or more of pick-up geofence 152 and summoning waypath 156 to computing device 104.

With continued reference to FIG. 1, computing device 104 may be configured to generate a parking map 160 for point of interest. As used in this disclosure, a "parking map" may include a map associated with a point of interest. A parking map may include one or more of a drop-off location designator 116, parking location designator 120, parking path designator 124, drop-off geofence 140, parking geofence 144, parking waypath 148, pick-up location designator 128, summoning path designator 132, pick-up geofence 152, and summoning waypath 156. Parking map may include one or more elements of survey data. As used in this disclosure, "survey data" is data measured and/or recorded by a remote device during or for the purpose of surveying. For example without limitation, any one of drop-off geofence 140, parking geofence 144, parking waypath 148, pick-up location designator 128, summoning path designator 132, pick-up geofence 152, and summoning waypath 156 may be considered survey data. According to some embodiments, parking map 160 may include more than one of any survey designators or survey data described herein. For example, in some cases, a parking map 160 may include a plurality of parking path designators 124 and parking waypaths 148. Likewise, in some embodiments, computing device 104 may generate a plurality of parking maps 160 for a point of interest.

With continued reference to FIG. 1, in some embodiments, computing device 104 may communicate parking map 160 to at least an autonomous vehicle 164. Computing device 104 may be communicative with at least an autonomous vehicle 164 by way of one or more networks, for example any networked described in this disclosure. In some embodiments, a user of an autonomous vehicle 164 may select a parking map 160 from a plurality of parking maps 160 generated by computing device.

Still referring to FIG. 1, in some embodiments, computing device 104 may be configured to receive site-specific driving rules 164 associated with point of interest. In some cases, parking map 160 may be generated to include site-specific driving rules 164. As used in this disclosure, "site-specific driving rules" are local rules which govern an autonomous vehicle only at a specific point of interest; site-specific driving rules are in contrast to global driving rules which govern an autonomous vehicle at substantially all points of interest. In some cases, a user may input site-specific driving rules 164 into computing device 104 directly or by way of another computing device in communication with the computing device. Alternatively and/or additionally, remote device 108 may communicate site-specific driving rules 164 to computing device 104. In some cases, a user may input sit-specific driving rules 164 into remote device 108.

Still referring to FIG. 1, in some embodiments, remote device 108 may be configured to package a survey data structure. As used in this disclosure, a "survey data structure" is aggregated data that includes a plurality of datatypes resulting from surveying a point of interest. In some cases, survey data structure may include one or more of drop-off geofence 140, parking geofence 144, parking waypath 148, pick-up geofence 152, and summoning waypath 156. In some cases, remote device 108 may be configured to upload survey data structure to computing device 104. In some embodiments, computing device 108 may generate parking map 160 using survey data structure.

Still referring to FIG. 1, in some embodiments, remote device 108 and locating sensor 136 may be further configured to survey at least a signage waypoint. As used in this disclosure, a "signage waypoint" is at least an element of data representative of a geographical location, area, or point of a road sign. In some embodiments, remote device 108 may be further configured to designate at least a signage designator to at least a signage waypoint. As used in this disclosure, a "signage descriptor" is at least an element of data representative of a specific road sign located at a specific location.

Still referring to FIG. 1, in some embodiments remote device 104 may be configured to upload a surveyor identifier and/or a task identifier to computing device 104. As used in this disclosure, a "surveyor identifier" is at least an element of data that uniquely identifies a remote device 108 used for surveying and/or a user of the remote device 108. As used in this disclosure, a "task identifier" is at least an element of data that uniquely identifies a specific surveying process. In some cases, computing device 104 may validate, surveyor identifier and/or task identifier, for example before accepting survey data from remote device 108.

Still referring to FIG. 1, in some embodiments, computing device 104 may validate parking waypath 148. As sued in this disclosure, "validation" is a process of ensuring that which is being "validated" complies with stakeholder expectations and/or desires. Stakeholders may include users, administrators, point of interest stakeholders, drivers, surveyors, property managers, parking lot/garage staff, and the like. Very often a specification prescribes certain testable conditions (e.g., metrics) that codify relevant stakeholder expectations and/or desires. In some cases, validation includes comparing a product, for example survey data and/or a parking map 160, against a specification. In some cases, computing device 104 may be additionally configured to validate the parking waypath 148 by segmenting the parking waypath 148 into a plurality of parking sub-waypaths and validating at least a parking sub-waypath of the plurality of parking sub-waypaths. As used in this disclosure, a "parking sub-waypath" is an element of a parking waypath that represents at least a portion of the parking path. In some cases, parking sub-waypath may include one or more waypoints along the parking path. In some embodiments, computing device 104 may be configured to validate any survey data, for example without limitation one or more of drop-off geofence 140, parking geofence, parking waypath 148, pick-up geofence 152, summoning waypath 156, and the like. In some cases, computing device 104 may validate parking map 160, for example prior to communicating the parking map 160 to an autonomous vehicle 164. Alternatively or additionally, in some cases, some or all validation processes may be performed using remote device 108. In some cases, at least a machine-learning process, for example a machine-learning model, may be used to validate survey data by computing device 104. Computing device 104 may use any machine-learning process described in this disclosure for this or any other function.

Still referring to FIG. 1, in some embodiments, remote device 108 may be configured to verify any survey data, for example parking waypath 148. As used in this disclosure, "verification" is a process of ensuring that which is being "verified" complies with certain constraints, for example without limitation system requirements, regulations, and the like. In some cases, verification may include comparing a product, e.g., survey data, against one or more acceptance criteria. For example, in some cases, a certain type of survey data, e.g., drop-off geofence 140, may be required to contain data of a certain type, size, information range. Ensuring that an individual instance of survey data is in compliance with acceptance criteria may, in some cases, constitute verification. In some cases, remote device 108 may verify survey data substantially before uploading survey data to computing device 104. In some cases, verification may include ensuring that survey data is complete, for example that all required survey data types, e.g., drop-off geofence 140 and the like, are present, readable, uncorrupted, and/or otherwise useful for map generating by computing device 104. In some cases, some or all verification processes may be performed by computing device 104. In some cases, at least a machine-learning process, for example a machine-learning model, may be used to verify survey data by remote device 108. Remote device 108 may use any machine-learning process described in this disclosure for this or any other function. In some embodiments, at least one of validation and/or verification includes without limitation one or more of supervisory validation, machine-learning processes, graph-based validation, geometry-based validation, and rules-based validation.

Figure 2:
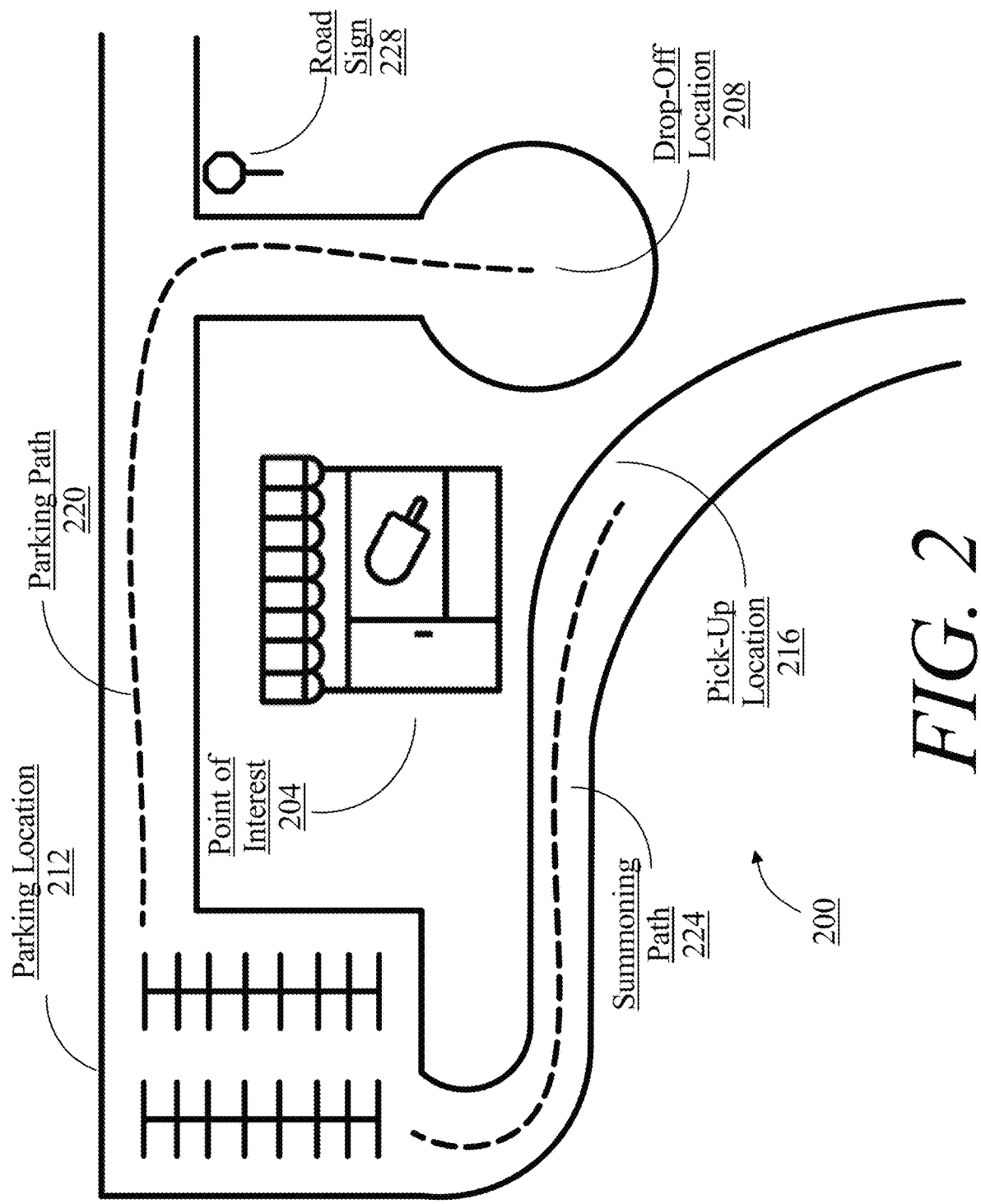
FIG. 2 illustrates an exemplary geographic region including a point of interest.

Referring now to FIG. 2, an exemplary geographic area 200 is illustrated with a point of interest 204. As described throughout, point of interest 204 may include any location which a person may be inclined to travel to (or from) by car (for at least a leg of the travel). Point of interest 204 as illustrated in FIG. 2, is depicted as a non-limiting exemplary ice-cream parlor. Point of interest 204 has associated with it a drop-off location 208, a parking location 212, and a pick-up location 216. In some cases, one or more of the above-mentioned locations may overlap and or include one another, for example drop-off location 208 and pick-up location 216 may include some or all of the same space. A parking path 220 may be located between drop-off location 208 and parking location 212. In some cases, parking path 220 is geographic path an autonomous vehicle will take to get from drop-off location 208 to parking location 212. A summoning path 224 may be located between parking location 212 and pick-up location 216. In some cases, summoning path 224 is a geographic path an autonomous vehicle will take to get from parking location 212 to pick-up location 216. A road sign 228 is shown substantially along parking path 220. Road sign 228 may include any road sign, including but not limited to regulatory signs, warning signs, guide signs (e.g., street name signs, route marker signs, expressway signs, freeway signs, welcome signs, informational signs, recreation and cultural interest signs, and the like), emergency management signs, temporary traffic control signs, school signs, railroad signs, and bicycle signs.

With continued reference to FIG. 2, in some embodiments, mapping of point of interest 204 may include surveying drop-off location 208, parking location 212, and/or pick-up location 216 to measure and record a drop-off geofence 140, a parking geofence 144, and/or a pick-up geofence 152. In some embodiments, mapping a point of interest 204 may additionally include recording parking path 220 and/or summoning path 224 to measure and/or record a parking waypath 148 and/or a summoning waypath 156.

Figure 3:
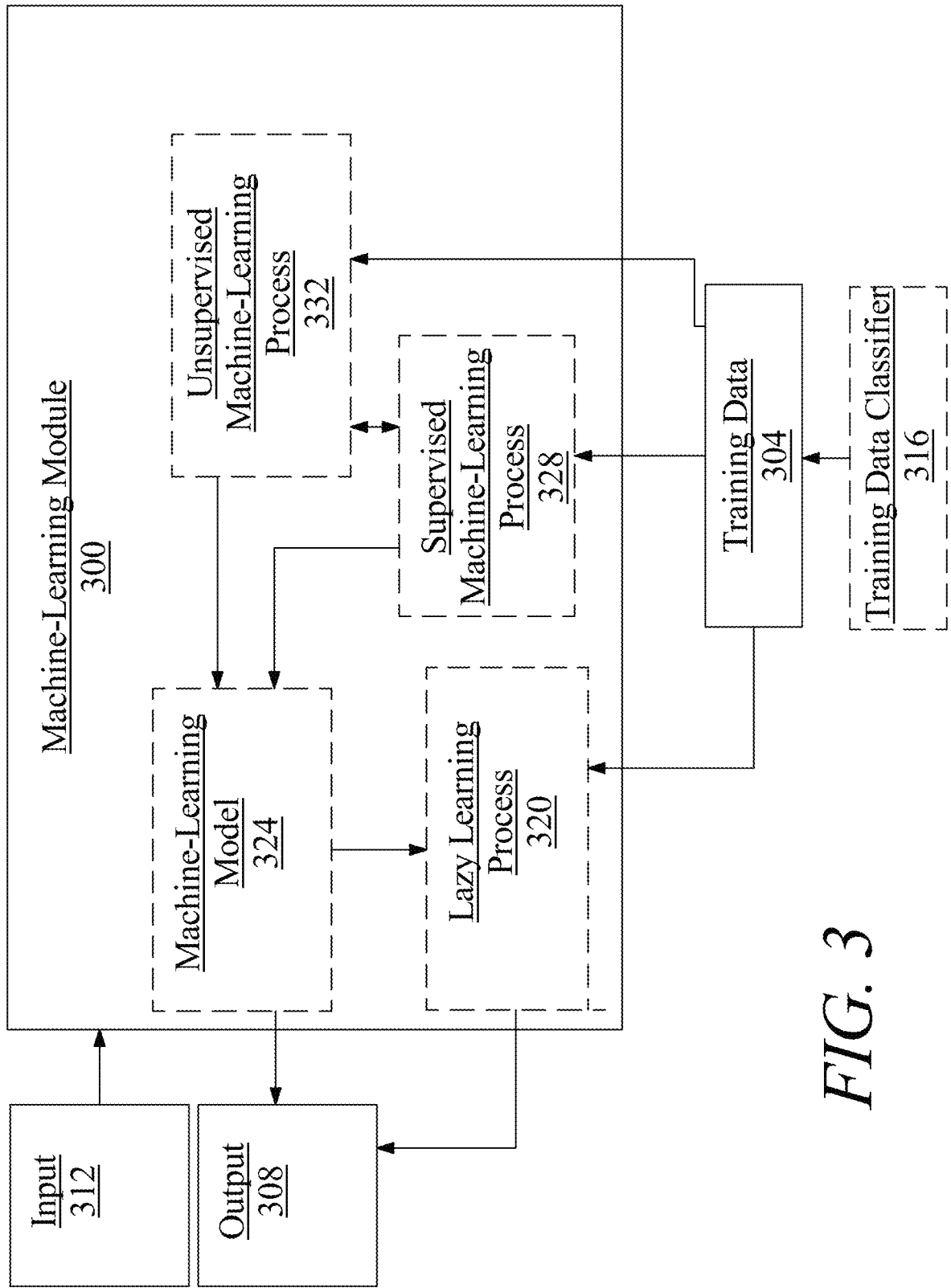
FIG. 3 is a block diagram illustrating an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include historical survey data and outputs may include a classification of survey data, for example "verified," "unverified," "validated," "unvalidated," "compliant," "non-compliant," and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to classifications of survey data, for example "verified," "unverified," "validated," "unvalidated," "compliant," "non-compliant," and the like. In some cases, training data may be further classified, for example based upon point of interest type (e.g., municipal building, retail building, and the like), parking location type (e.g., parking garage, parking lot, on-street parking, and the like). In some cases, a point of interest may serve a commercial interest, for example a business having a fleet of vehicles, such as without limitation a shipping company, a transit company, a rental vehicle company, a police department, and the like. In some cases, point of interest may be substantially private and not used by general public, for example a private residence. In some cases, training data may be classified according to usage, large commercial usage compared to retail or consumer usage.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include survey data as described above as inputs, verification and/or validation status or classification as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
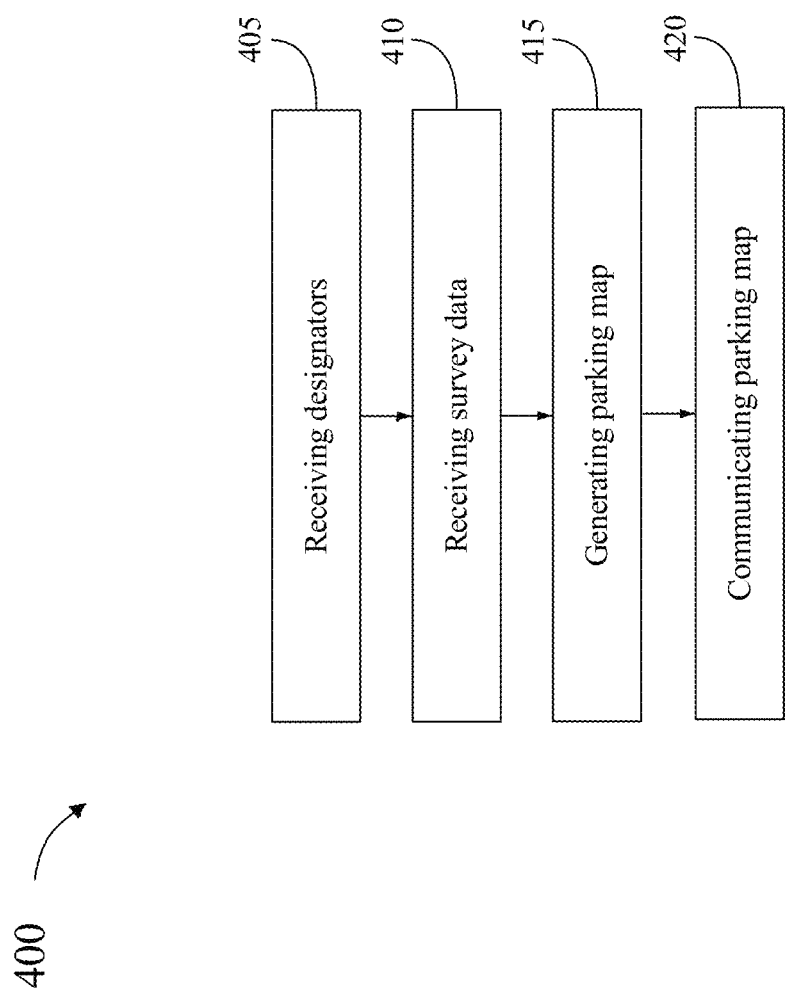
FIG. 4 is a flow diagram illustrating an exemplary method of mapping a parking area for autonomous parking.

Referring now to FIG. 4, an exemplary method 400 of mapping a parking area for autonomous parking is illustrated by way of a flow diagram. At step 405, method 400 includes receiving, using a computing device 104, survey designators. Survey designators may include any survey designators described in this disclosure, including with reference to FIGS. 1-3. Computing device may include any computing device described in this disclosure, including with reference to FIGS. 1-3 and 5. In some cases, survey designators may include one or more of a point of interest designator for a point of interest 204, a drop-off location designator for a drop-off location 208 associated with the point of interest, a parking location designator for a parking location 212 associated with the point of interest, and a parking path designator for a parking path 220 between the drop-off location and the parking location.

With continued reference to FIG. 4, at step 410, method 400 may include receiving, using computing device 104, survey data from a remote device 108 having at least a locating sensor 136. Survey data may include any survey data described in this disclosure, including with reference to FIGS. 1-3. In some cases, survey data may include a drop-off geofence for drop-off location, a parking geofence for parking location, and/or a parking waypath for a parking path. In some embodiments, survey data may additionally include a pick-up geofence for pick-up location and/or a summoning waypath for summoning path. In some embodiments at step 410, method 400 may additionally include surveying, using a remote device 108 having at least a locating sensor 136, drop-off geofence. Remote device may include any remote device and/or computing device described in this disclosure, including with reference to FIGS. 1-3 and 5. In some cases, step 410 may additionally include surveying survey data associated with point of interest. Survey data may include any survey data described in this disclosure, for example with reference to FIGS. 1-3. In some cases, step 410 may include surveying, using remote device 108 with at least a locating sensor 136, a drop-off geofence for drop-off location 208. In some embodiments, remote device 108 may include a remote computing device and at least a locating sensor communicatively connected to the remote computing device. In some cases, at least a locating sensor 136 may include a global positioning sensor.

Still referring to FIG. 4, in some embodiments at step 410, method 400 may additionally include surveying, using remote device 108 with at least a locating sensor 136, a parking geofence for parking location 212. Parking geofence may include any parking geofence described in this disclosure, including with reference to FIGS. 1-3. In some embodiments, at step 410, method 400 may additionally include recording, using remote device 108 with at least a locating sensor 136, a parking waypath for parking path 220. Parking waypath may include any parking waypath described in this disclosure, including with reference to FIGS. 1-3. In some embodiments, parking waypath may include at least a signage waypoint. In some embodiments, step 410 may additionally include surveying, using remote device 108, at least a signage waypoint and designating, using the remote device 108, at least a signage designator to the at least a signage waypoint. Signage waypoint may include any signage waypoint described in this disclosure, for example with reference to FIGS. 1-3. Signage designator may include any signage designator described in this disclosure, including with reference to FIGS. 1-3. In some embodiments, parking map may additionally include at least a signage designator.

Still referring to FIG. 4, in some embodiments, at step 410 method 400 may additionally include uploading, using remote device 108, drop-off geofence, parking geofence, and parking waypath to computing device 104. In some embodiments, step 410 may include uploading survey data to computing device 104, using remote device 108.

With continued reference to FIG. 4, at step 415, method 400 may include generating, using computing device 104, a parking map for point of interest. Parking map may include any parking map described in this disclosure, for example with reference to FIGS. 1-3. In some cases, parking map may include drop-off location designator, parking location designator, parking path designator, drop-off geofence, parking geofence, and parking waypath. In some embodiments, parking map may include survey designators and survey data.

With continued reference to FIG. 4, at step 420 method 400 may communicate, using computing device 104, parking map to at least an autonomous vehicle. Autonomous vehicle may include any autonomous vehicle described in this disclosure, for example with reference to FIGS. 1-3.

Still referring to FIG. 4, in some embodiments, method 400 may additionally include receiving, using computing device 104, a pick-up location designator for a pick-up location 216 associated with point of interest and a summoning path designator for a summoning path 224 between the parking location and the pick-up location. Pick-up location designator may include any pick-up location designator described in this disclosure, including with reference to FIGS. 1-3. Summoning path designator may include any summoning path designator described in this disclosure, including with reference to FIGS. 1-3. In some embodiments, method 400 may additionally include surveying a pick-up geofence for pick-up location 216 and recording a summoning waypath for summoning path 224. Pick-up geofence may include any pick-up geofence described in this disclosure, including with reference to FIGS. 1-3. Summoning waypath may include any summoning waypath described in this disclosure, including with reference to FIGS. 1-3. In some embodiments, method 400 may additionally include uploading, using remote device 108, pick-up geofence and summoning waypath. In some embodiments, parking map may additionally include pick-up location designator, summoning path designator, pick-up geofence, and summoning waypath.

Still referring to FIG. 4, in some embodiments, method 400 may additionally include packaging, using remote device 108, a survey data structure. Survey data structure may include any survey data structure described in this disclosure, including with reference to FIGS. 1-3. In some cases, survey data structure may include drop-off geofence, parking geofence, parking waypath, pick-up geofence, and/or summoning waypath. In some cases, method 400 may additionally include uploading, using remote device 108, survey data structure to computing device 104.

Still referring to FIG. 4, in some embodiments, method 400 may additionally include uploading, using remote device 108, a surveyor identifier and/or a task identifier to computing device 108 and validating, using the computing device 104, the surveyor identifier and the task identifier. Surveyor identifier may include any surveyor identifier described in this disclosure, including with reference to FIGS. 1-3. Task identifier may include any task identifier described in this disclosure, including with reference to FIGS. 1-3. Validating may include any validation process described in this disclosure, for example with reference to FIGS. 1-3. In some embodiments, method 400 may additionally include receiving, using computing device, a surveyor identifier and a task identifier from remote device; and validating, using the computing device, the surveyor identifier and the task identifier.

Still referring to FIG. 4, in some embodiments, method 400 may additionally include validating, using computing device 104, parking waypath. In some cases, validating parking waypath may additionally include segmenting the parking waypath into a plurality of parking sub-waypaths and validating at least a parking sub-waypath of the plurality of parking sub-waypaths Parking sub-waypath may include any parking sub-waypath described in this disclosure, including with reference to FIGS. 1-3.

Still referring to FIG. 4, in some embodiments, method 400 may additionally include receiving, using computing device 104, site-specific driving rules associated with point of interest. In some cases, parking map may additionally include site-specific driving rules. Site-specific driving rules may include any site-specific driving rules described in this disclosure, for example with reference to FIGS. 1-3.

Referring again to FIG. 1, additional exemplary embodiments of system 100 are described below. In some embodiments, at least a survey designator 112, 116, 120, 124, 128, and/or 132 may be received from a device and/or user substantially different that remote device 108 and/or surveyor. For example, in some cases, an administrator may input at least a survey designator 112, 116, 120, 124, 128, and/or 132 prior to a surveyor using remote device 108 to record survey data 140, 144, 148, 152, and/or 156. In some embodiments, surveyor may use at least a survey designator input by administrator in recording survey data. For example, in some cases, administrator may input at least a survey designator (e.g., drop-off location designator 116) that includes a rough (i.e., approximate) location and/or coordinates for at least a location at point of interest (e.g., drop-off location). A surveyor may download, onto remote device 108, at least a designator (e.g., drop-off location designator 116) and use the at least a designator as a prompt for survey data collection; for example, the surveyor may go to the rough location included in the at least a designator and begin surveying (e.g., drop-off geofence 140). In some cases this functionality may be referred to as "top-down" mapping. Top-down mapping allows different users to contribute different functions in the mapping process. For example, an administrator may determine generally parking map specifications for a point of interest by inputting one or more survey designators and a surveyor may follow prompts derived from these one or more survey designators in surveying the point of interest.

Still referring to FIG. 1, in some embodiments, at least a survey designator 112, 116, 120, 124, 128, and/or 132 may be uploaded by surveyor, for instance using remote device 108, substantially coincidentally with survey data 140, 144, 148, 152, and/or 156. In some cases, this functionality may be referred to as "bottom-up" mapping. Bottom-up mapping allows for mapping of a point of interest to occur at substantially one-time and with as few as one user using one (remote) device 108. For example, a surveyor may travel to a point of interest to be mapped and input one or more survey designators along with survey data. In some embodiments, at least a waypath 148 and/or 156 may be recorded as a plurality of sub-waypaths, waypoints, and/or segments. Likewise, according to some embodiments, at least a geofence 140, 144, and/or 156 may be surveyed as a plurality of sub-geofences, waypoints, and/or segments. In some cases, survey data may include at least a plurality of segments of survey data. In some cases, segments of survey data may have one or more designators associated (e.g., signage waypoint and signage designator). Alternatively or additionally, in some cases, multiple segments of survey data may be associated with only one designator.

Elements of the present disclosure may be further understood with reference to exemplary parameters and ranges within the table below. Ranges below are provided for exemplary purposes and are not intended to be limiting. In some cases, ranges may be theoretically limitless, and range boundaries provided below may represent practical limits for some exemplary embodiments.

|  | Min. | Nom. | Max. |
|---|---|---|---|
| Surveying Precision (m) | 0.0001 | 0.1 | 100 |
| No. waypoints in waypath (-) | 2 | 5,000 | >500,000,000 |
| Distance of waypath (km) | 0.001 | 1 | >1,000 |
| Area of geofence (m²) | 0.1 | 15,000 | >500,000,000 |
| Parking space per automated parked car (m²) | 5 | 25 | >5,000 |
| Exemplary Locating Sensor | a global position sensor (GPS), a computer vision system, for example with pose estimation based upon feature tracking of objects, stereoscopic vision, radio-based locating sensors, for example RAdio Detection And Ranging (RADAR) and Ultra-Wideband, light-based locating sensors, for example Light Detection And Ranging (LiDAR), sound-based locating sensors, for example sound navigation and ranging (Sonar), ultrasound-based locating sensors, radio frequency identification (RFIS) sensors, Bluetooth, infrared-based locating sensors, cellular-based locating sensors, wireless local area network (WLAN) based sensors, laser-based locating sensors, and the like. | | |
| Exemplary Geofences | Drop-off geofence, pick-up geofence, parking geofence, and the like. | | |
| Exemplary Waypaths | Parking waypath, summoning waypath, and the like. | | |
| Exemplary Waypoints | Waypoints may be included in either geofences of waypath, also signage waypoints. | | |

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
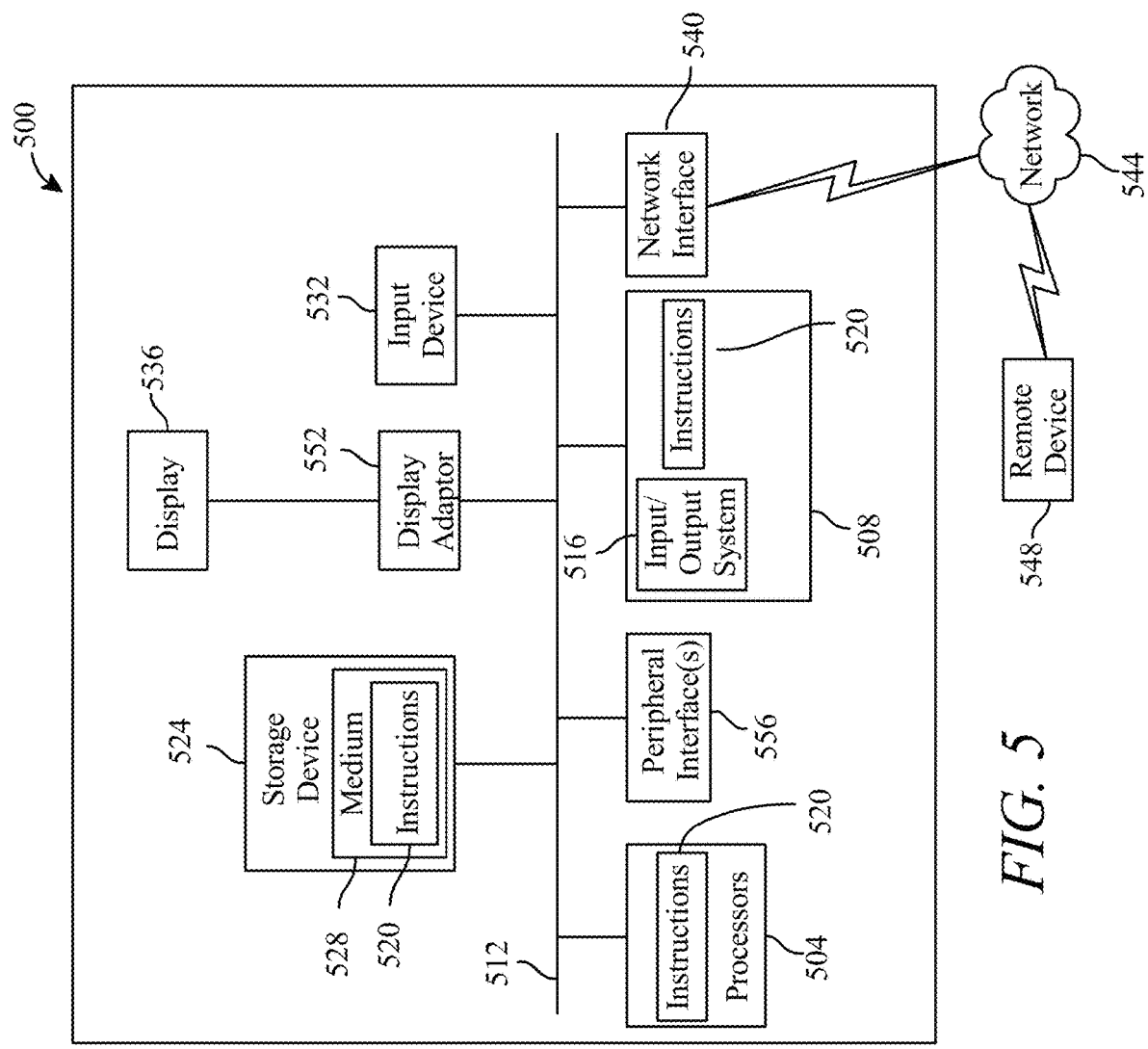
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

The invention claimed is:

1. A method of mapping a parking area for autonomous parking, the method comprising:
   receiving, using a computing device, a point of interest designator for a point of interest, a drop-off location designator for a drop-off location associated with the point of interest, a parking location designator for a parking location associated with the point of interest, and a parking path designator for a parking path between the drop-off location and the parking location;
   validating, using the computing device, a remote device having at least a locating sensor as a function of a surveyor identifier comprising at least an element of data configured to uniquely identify the remote device, wherein the remote device is configured to record survey data;
   receiving, using the computing device, the survey data of the point of interest from the remote device as a function of validating the remote device, wherein the survey data comprises:
      a drop-off geofence for the drop-off location;
      a parking geofence for the parking location;
      a parking waypath for the parking path; and
      site-specific driving rules associated with the point of interest;
   generating, using the computing device, a parking map for the point of interest, wherein the parking map comprises the drop-off location designator, the parking location designator, the parking path designator, the drop-off geofence, the parking geofence, the parking waypath, and the site-specific driving rules;
   verifying, using the computing device, the survey data, as a function of a machine-learning model, wherein the machine learning model is trained with training data correlating survey data to survey data classifications; and
   validating, using the computing device, the parking waypath, wherein validating the parking waypath further comprises:
      segmenting the parking waypath into a plurality of parking sub-waypaths; and
      validating at least a parking sub-waypath of the plurality of parking sub-waypaths.

2. The method of claim 1, further comprising communicating, using the computing device, the parking map to at least an autonomous vehicle.

3. The method of claim 1, further comprising:
   receiving, using the computing device, a pick-up location designator for a pick-up location associated with the point of interest and a summoning path designator for a summoning path between the parking location and the pick-up location;
   wherein the survey data, further comprises:
      a pick-up geofence for the pick-up location; and
      a summoning waypath for the summoning path; and
   wherein the parking map further comprises the pick-up location designator, the summoning path designator, the pick-up geofence, and the summoning waypath.

4. The method of claim 1, wherein the parking waypath further comprises:
   at least one signage waypoint; and
   the parking map further comprises at least a signage designator to the at least one signage waypoint.

5. The method of claim 3, wherein the survey data further comprises a survey data structure, wherein the survey data structure comprises the drop-off geofence, the parking geofence, the parking waypath, the pick-up geofence, and the summoning waypath.

6. The method of claim 1, further comprising:
   receiving, using the computing device, a task identifier from the remote device; and
   validating, using the computing device, the task identifier.

7. The method of claim 1, wherein the remote device comprises:
   a remote computing device; and the at least a locating sensor communicatively connected to the remote computing device, wherein the at least a locating sensor comprises a global positioning sensor.

8. The method of claim 1, further comprising:
verifying, using the remote device, the parking waypath.

9. A system for mapping a parking area for autonomous parking, the system comprising:
a computing device configured to:
receive a point of interest designator for the point of interest, a drop-off location designator for the drop-off location, a parking location designator for the parking location, and a parking path designator for a parking path;
validate, using the computing device, a remote device having at least a locating sensor as a function of a surveyor identifier comprising at least an element of data configured to uniquely identify the remote device, wherein the remote device is configured to record survey data;
receive the survey data of the point of interest from the remote device as a function of validating the remote device, wherein the survey data comprises:
a drop-off geofence for a drop off location associated with the point of interest;
a parking geofence for a parking location associated with the point of interest;
a parking waypath for the parking path between the drop-off location and the parking location; and
site-specific driving rules associated with the point of interest;
generate a parking map for the point of interest, wherein the parking map comprises the drop-off location designator, the parking location designator, the parking path designator, the drop-off geofence, the parking geofence, the parking waypath, and the site-specific driving rules;
verify, using the computing device, the survey data, as a function of a machine-learning model, wherein the machine-learning model is trained with training data correlating survey data to survey data classifications; and
validate, using the computing device, the parking waypath, wherein validating the parking waypath further comprises:
segmenting the parking waypath into a plurality of parking sub-waypaths; and
validating at least a parking sub-waypath of the plurality of parking sub-waypaths.

10. The system of claim 9, wherein the computing device is further configured to communicate the parking map to at least an autonomous vehicle.

11. The system of claim 9
wherein the computing device is further configured to:
receive a pick-up location designator for a pick-up location associated with the point of interest and a summoning path designator for a summoning path between the parking location and the pick-up location;
wherein the survey data further comprises:
a pick-up geofence for the pick-up location; and
a summoning waypath for the summoning path; and
wherein the parking map further comprises the pick-up location designator, the summoning path designator, the pick-up geofence, and the summoning waypath.

12. The system of claim 11, wherein the survey data further comprises a survey data structure, wherein the survey data structure comprises the drop-off geofence, the parking geofence, the parking waypath, the pick-up geofence, and the summoning waypath; and
upload the survey data structure to the computing device.

13. The system of claim 9, wherein the parking waypath further comprises at least one signage waypoint; and
the parking map comprises at least a signage designator to the at least one signage waypoint.

14. The system of claim 9, wherein the computing device is further configured to:
receive a task identifier, from the remote device; and
validate the task identifier.

15. The system of claim 9, wherein the remote device comprises:
a remote computing device; and
the at least a locating sensor communicatively connected to the remote computing device, wherein the at least a locating sensor comprises a global positioning sensor.

* * * * *